(12) United States Patent
Thiagarajan et al.

(10) Patent No.: US 10,038,586 B2
(45) Date of Patent: Jul. 31, 2018

(54) METHOD AND SYSTEM FOR PREAMBLE DETECTION IN A BASEBAND MODULATED DIGITAL COMMUNICATION SYSTEM

(71) Applicant: MMRFIC Technology Pvt. Ltd., Bangalore (IN)

(72) Inventors: Ganesan Thiagarajan, Bengaluru (IN); Saravanakumar Ganeshan, Bengaluru (IN)

(73) Assignee: MMRFIC Technology Pvt. Ltd.

( * ) Notice: Subject to any disclaimer, the term of this patent is extended or adjusted under 35 U.S.C. 154(b) by 0 days.

(21) Appl. No.: 15/442,624

(22) Filed: Feb. 25, 2017

(65) Prior Publication Data

US 2018/0152334 A1 May 31, 2018

(51) Int. Cl.
*H04L 27/10* (2006.01)
*H04L 27/18* (2006.01)
*H04L 27/36* (2006.01)
*H04L 25/02* (2006.01)
*H04L 27/12* (2006.01)

(52) U.S. Cl.
CPC .............. *H04L 27/36* (2013.01); *H04L 25/02* (2013.01); *H04L 27/12* (2013.01)

(58) Field of Classification Search
CPC ......... H04L 27/36; H04L 25/02; H04L 17/12; H04L 7/06; H04B 7/2678
USPC ....... 375/272, 275, 279, 280, 303, 307, 308, 375/329, 331, 334, 335
See application file for complete search history.

(56) References Cited

U.S. PATENT DOCUMENTS 4,847,869 A * 7/1989 Labedz ................ H04B 7/2678
375/331
2003/0091121 A1* 5/2003 Kenmochi ................ H04L 7/06
375/272

* cited by examiner

*Primary Examiner* — Phuong Phu

(57) ABSTRACT

According to an aspect of the present disclosure, a method in a digital communication system comprising, receiving a first data packet comprising a set of preamble bits for transmission, selecting a first modulation parameter in relation with a first bit sequence property of the first data packet, modulating a carrier signal with the first modulation parameter to generate a first baseband signal embedding information in the data packet, receiving a second baseband signal at a receiver, performing correlation of the second baseband signal and a reference baseband signal to generate a correlation result and demodulating the second baseband signal to form a received bits when the correlation result peaks above a threshold value.

9 Claims, 8 Drawing Sheets

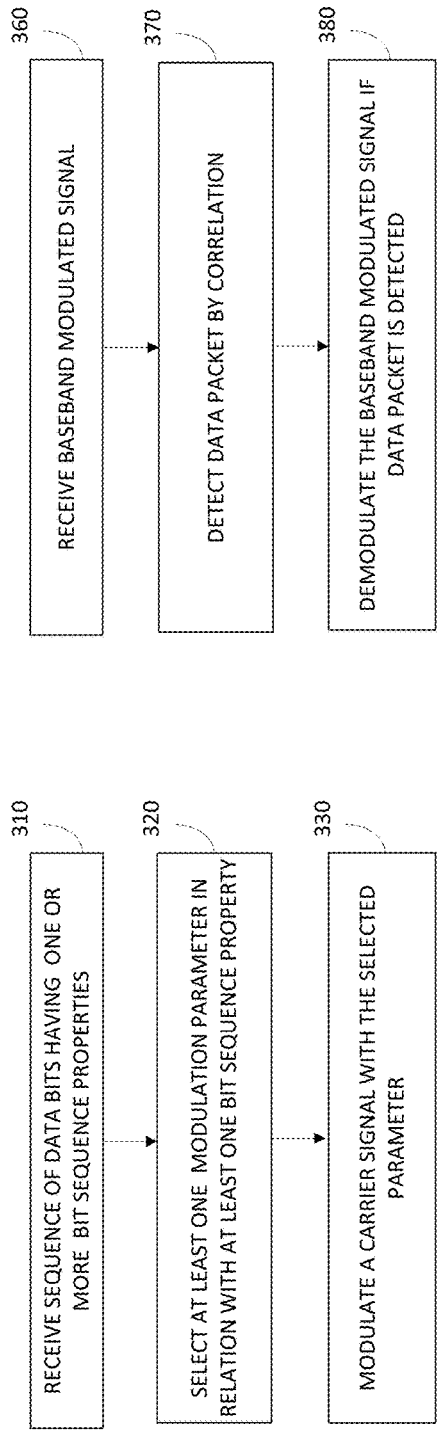
FIG. 3A
FIG. 3B
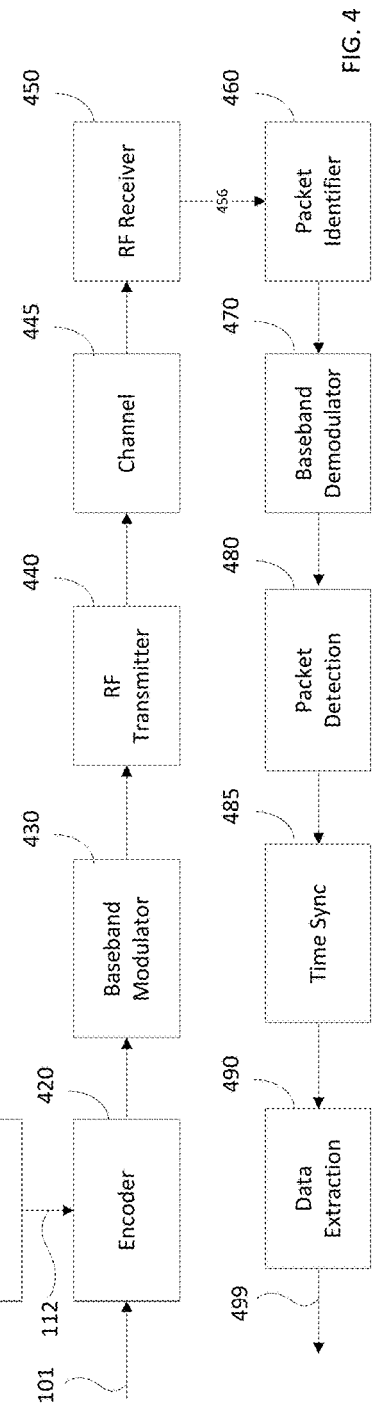
FIG. 4

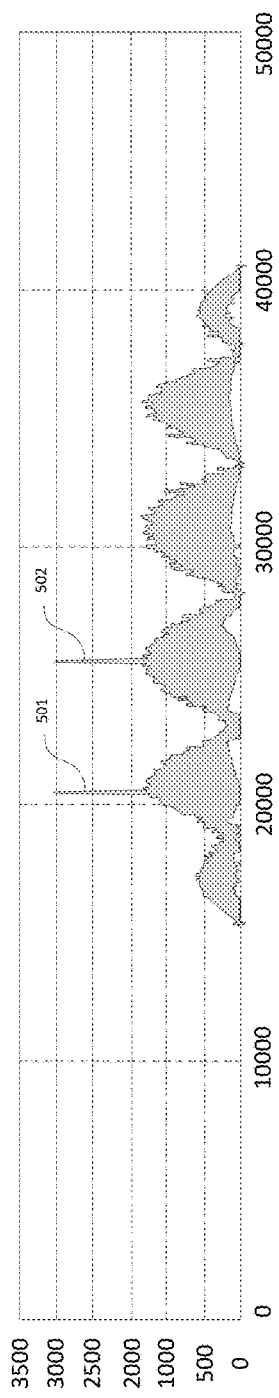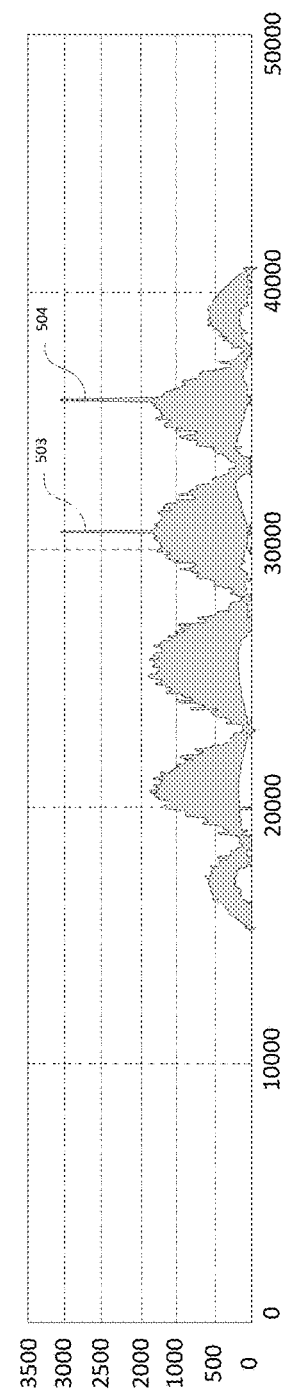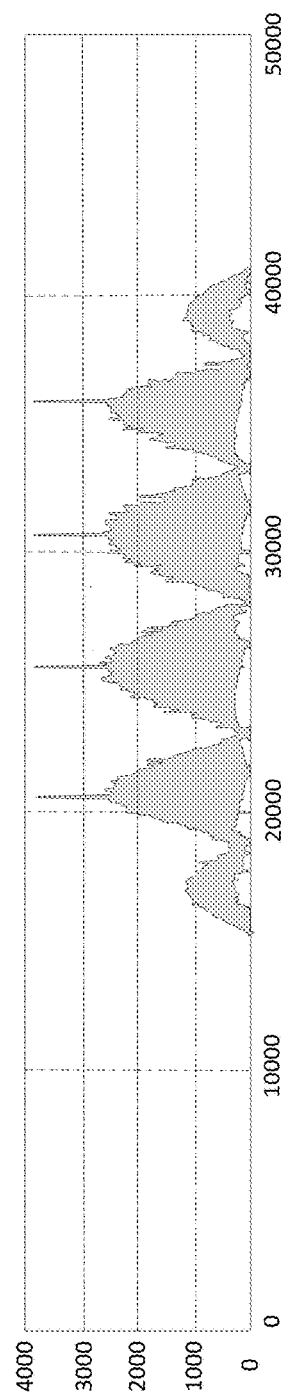
FIG.5A
FIG.5B
FIG.5C

METHOD AND SYSTEM FOR PREAMBLE DETECTION IN A BASEBAND MODULATED DIGITAL COMMUNICATION SYSTEM

CROSS REFERENCES TO RELATED APPLICATIONS

This application claims priority from Indian patent application No. 201641040867 filed on Nov. 30, 2016 which is incorporated herein in its entirety by reference.

BACKGROUND

Technical Field

Embodiments of the present disclosure relate generally to digital communication system and more specifically to a method and system for preamble detection in a baseband modulated digital communication system.

Related Art

In a digital communication system information is digitized into sequence of bits. The sequence of bits is baseband modulated before getting transmitted over a channel. The sequence of bits is often packetized as payload at the transmitter, where additional preamble bits are prefixed to the payload bits for enabling synchronization at the receiver. The preamble bits are typically pseudo-random sequences having good autocorrelation property. The autocorrelation property of the preamble bits is often exploited at the receiver to detect the packet and enable synchronization. The standard sequences such as Golay sequence have very good autocorrelation property in the bit form. However, autocorrelation property of the bit sequences is lost when the bit sequences are baseband modulated, for example, by performing Frequency Shift Keying, Phase Shift Keying and Amplitude Shift Keying operation. Thus, receiver requires to demodulate and obtaining the bit sequence first to detect the presence or the absence of the transmitted packet.

SUMMARY

According to an aspect of the present disclosure, a method in a digital communication system comprising, receiving a first data packet comprising a set of preamble bits for transmission, selecting a first modulation parameter in relation with a first bit sequence property of the first data packet, modulating a carrier signal with the first modulation parameter to generate a first baseband signal embedding information in the data packet, receiving a second baseband signal at a receiver, performing correlation of the second baseband signal and a reference baseband signal to generate a correlation result and demodulating the second baseband signal to form a received bits when the correlation result peaks above a threshold value.

In one embodiment, a Frequency Shift Keying (FSK) operation is performed on the carrier signal and the first modulation parameter is $\Delta f$ and the first bit sequence property is a symbol duration $T_b$. In that, the product of $\Delta f$, $T_b$ and N is selected as an integer and $\Delta f$ is selected an range between $1/(NT_b)$ and $M/(T_b)$, N representing length of the data packet, and M is an integer starting from 1.

In another embodiment a Quadrature Phase Shift Keying (QPSK) operation is performed on the carrier signal and the modulation parameter is $\Delta\Theta$ and the bit sequence property is symbol duration $T_b$. In that, the product of $\Delta\Theta$, $T_b$ and N is selected as an integer and $\Delta\Theta$ is selected in the range between $2\pi/(NT_b)$ and $2\pi M/(T_b)$, N representing length of the data packet, and M is an integer starting from 1.

Several aspects are described below, with reference to diagrams. It should be understood that numerous specific details, relationships, and methods are set forth to provide a full understanding of the present disclosure. One who skilled in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF DRAWINGS

FIG. 3A is a block diagram illustrating the manner in which the modulator is implemented in one embodiment.

FIG. 3B is a block diagram illustrating the manner in which the demodulator is implemented in one embodiment.

FIG. 4 is a block diagram illustrating an example digital communication system in an embodiment.

FIGS. 5A and 5B respectively are illustrating the correlation of modulated A and B sequences with Modulated [A B A B] when BFSK modulation parameter chosen as small value, according to one embodiment.

FIG. 5C illustrates summation of correlation with sequence A and B when BFSK modulation parameter chosen as small value, according to one embodiment.

DETAILED DESCRIPTION OF THE PREFERRED EXAMPLES

Figure 1A:
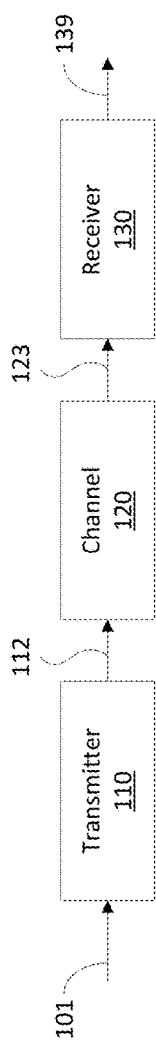
FIG. 1A is a block diagram of an example digital communication system in one embodiment.

FIG. 1A is a block diagram of an example digital communication system in one embodiment. The digital communication system is shown comprising transmitter 110, channel 120, and receiver 130. Each element is described below in further detail.

The transmitter 110 performs several signal processing operations on a signal (carrying information) on path 101. The signal may be in analog and/or digital form. The path 101 may comprise a conductive path carrying electrical signal, an optical fiber carrying optical signal, wireless path transmitting electromagnetic waves and any other path capable of carrying information carrying signal. Similarly, processed preamble signal/bit sequence is provided to a channel on path 112.

The receiver 130 receives a transmitted signal form the channel 120 and performs several signal processing operations, some in conjunction with the processing performed at the transmitter 110, to retrieve and/or reproduce the signal on path 101. The reproduced signal is provided on path 139.

The channel 120 represents a connectivity established between the transmitter 110 and receiver 130 in accordance with digital communication standards such as GSM, CDMA, 3G, 4G, and Wi-Fi, WLAN, for example. The connectivity differs in terms communication parameters such as of frequency bands, protocols, modulations as is well known in the art. The manner in which the transmitter 110 and receiver 130 may be implemented in an embodiment is further described below.

Figure 1B:
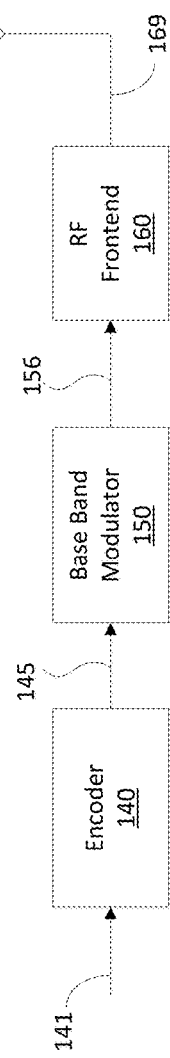
FIG. 1B is an example transmitter in one embodiment.

FIG. 1B is an example transmitter in one embodiment. The transmitter is shown comprising encoder 140, modulator 150, and RF frontend 160. Each element is further described below.

The encoder 140 generates sequence of data bits representing the information received on path 141. In one embodiment, the data bits are packetized and sequence of packets are provided on the path 145. The data bits are packetized in accordance with the formats prescribed by desired digital communication standards employed for connectivity (the channel 120). For example, the encoder may generate sequence of packets in accordance with the 3GPP standard, Wireless LAN standards such as 802.11g, for example. The packets are provided on the path 145.

The baseband modulator 150 alters (modulates) one or more parameters of a carrier signal as a function of one or more bits in the packets received on path 145. The modulated carrier signal is provided on the path 156. Thus, the value of one or more parameter of the carrier signal at any time instance represents the bit value (bits value) at the corresponding instance. The parameters may comprise amplitude, phase or frequency of the carrier signal. The carrier signal may comprise a sinusoidal signal for example. The baseband modulator may be implemented in digital or analog domain.

The RF frontend 160 converts the modulated baseband signal 156 to a transmit signal suitable for propagation on the channel 120. The conversion may include, filtering, up converting the frequency, amplifying the signal etc. In one embodiment, the transmit signal 169 is radiated through the antenna.

Figure 1C:
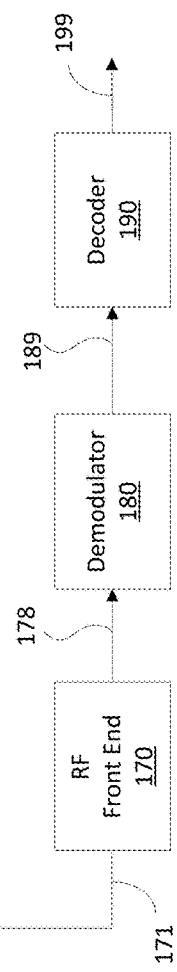
FIG. 1C is an example receiver in one embodiment.

FIG. 1C is an example receiver in one embodiment. The receiver is shown comprising RF frontend 170, demodulator 180, and Decoder 190. Each element is further described below.

The RF frontend 170 receives the RF signal from channel 120 on path 171 and converts the received signal to a baseband signal. The conversion to the baseband signal may be performed in conjunction with the operations performed in the RF Frontend 160. The converted baseband signal replicates the signal on path 156. The RF frontend 170 may comprise, narrow, tuner, amplifier, down convertor, multistage mixers for example. The baseband signal is provided on path 178.

The demodulator 180 converts the baseband signal received on path 178 to sequence of data bits. The demodulator may determine the bit value based on the value of one or parameters that are varied as function of the bit value. For example, the demodulator may determine the frequency, phase or amplitude of the baseband signal at a given instance to determine the bit value at that instance. The sequence of data bits (or packets) is provided on path 189. The decoder 190 extracts the information from the sequence of data bits or packets received on path 189. The information is provided on path 199.

In one embodiment, the transmitter 110 and the receiver 130 are synchronized for accurate information retrieval on path 199. The synchronization is achieved by inserting several bits in each packet for identifying the packets, synchronization and decoding sequence of data bits. An example data packet formats enabling identification and synchronization and decoding is further described below.

Figure 2A:
FIG. 2A is an example data packet illustrating the manner in which the information is encoded in an embodiment.
Figure 2B:
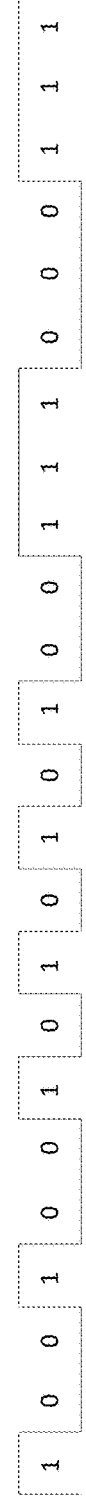
FIG. 2B is an example bit sequence representing a data packet.
Figure 2C:
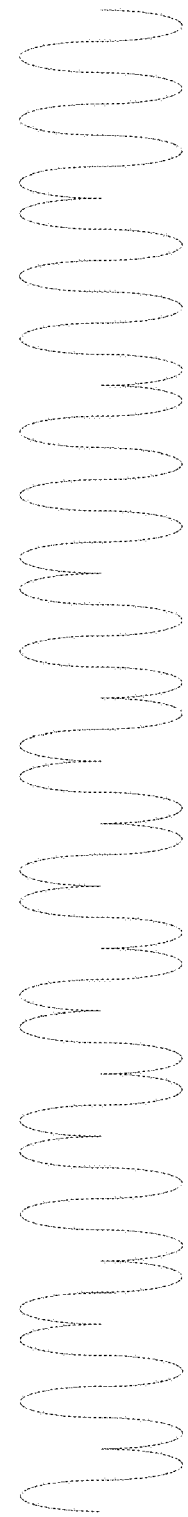
FIG. 2C is an example modulated signal.

FIG. 2A is an example data packet illustrating the manner in which the information is encoded in an embodiment. As show there the packet 201 comprises preamble 210, header 220, and payload 230. The preamble is a known pseudo-random sequence (one or more sets of independent pseudo sequences) having good autocorrelation property. The header 220 is set of bits carrying information on the packet format and may comprise information such as packet number, payload length, error control codes for example. The payload 230 is the set of bits representing the information on path 101. FIG. 2B is an example bit sequence representing a packet 201. In that the preamble is shown as a sequence of bits 100100, the header is shown as sequence of bits 10101 and the payload is shown as the sequence of bits 100111000111. The FIG. 2C is an example modulated signal in that phase of the carrier signal is set to zero degrees to represent bit value 1 and the phase of the carrier signal is set to 180 degrees to represent bit value 0.

Conventionally, a decoder performs autocorrelation of a received sequence of data bits and detects the presence preamble (due to its high self correlation property). Such detection of the preamble enables synchronization of conventional decoder with conventional encoder (on the transmitter side). In general, a clock signal is referenced to read the bit stream. Thus, the clock requires to be synchronized to avoid error in the determining the information. The time instance of the autocorrelation peak is generally taken for primary synchronization. As a result, the conventional demodulator is operative and demodulates the signal that is not relevant or when the conventional decoder is not primarily synchronized with the transmitter. There by render the conventional receiver inefficient at least in terms of power consumption.

FIG. 3A is a block diagram illustrating the manner in which the modulator is implemented in one embodiment. As shown there in block 310, the modulator 150, receive sequence of data having self correlation property. The bit sequence has parameter such as bit rate, pulse width, number of bits in a packet for example. In block 320, the modulator 150, select at least one modulation parameter applied in modulation as a function of at least one bit sequence property. The parameter may comprise amplitude, frequency or phase limits, frequency/phase variations, etc., for example. In block 330, the modulator 150, modulates the bit sequence in accordance with selected modulation parameter such that the modulated signal shall continue to maintain the self correlation property of the bit sequence.

FIG. 3B is a block diagram illustrating the manner in which the demodulator is implemented in one embodiment. As shown there in the block 360, the demodulator 180, receives a baseband modulated signal. In block 370, the demodulator 180, perform autocorrelation on the received baseband modulated signal. In block 380, the demodulator 180, demodulates the baseband signal generate a bit sequence when the autocorrelation value is greater than a threshold. As a result, the demodulator is operative at least when the relevant data stream is detected and the correlation instance may be applied for preliminary clock synchronization.

In one embodiment, the baseband modulator 150 perform frequency shift Keying operation, in that the frequency of a carrier signal is altered to represent symbol or a bit value. The baseband modulated signal for a binary frequency shift keying may be represented as:

$$X(t) = A\cos\left(2\pi\left[f_c + b(t)\frac{\Delta f}{2}\right]t + \phi\right) \quad (1)$$

In that, b(t) a bit sequence received from encoder 140 takes value +1 and −1 for binary zero and one respectively.

In one embodiment the modulator 150 selects the parameter Δf in relation to the symbol duration $T_b$ and the length of the preamble sequence N such that a product of Δf, N and Tb is an integer. In one embodiment the Δf is set to a value in the range of $$\frac{1}{NTb}$$

(being smallest value) and $$\frac{M}{Tb}$$

(being the largest value), wherein M is an integer starting from 1. However, we can choose M such that the spectral emission requirements of transmitter are met. The baseband modulated signal X(t) is provided to RF frontend 160.

The demodulator 180 performs autocorrelation between the received baseband signal $X_1(t)$ and a known baseband signal $X_2(t)$. The correlation value may be represented as Corr[$X_1(t),X_2(t)$] and the relation may be expressed as:

$$\int_0^{NTb} A_1\cos\left(2\pi\left[f_c + b_1(t)\frac{\Delta f}{2}\right]t + \phi\right) * A_2\cos\left(2\pi\left[f_c + b_2(t)\frac{\Delta f}{2}\right]t + \phi\right)dt \quad (2)$$

The integration in the relation (2) simplifies to:

$$\frac{A_1 A_2}{2}\int_0^{NTb}\cos\left(2\pi[b_1(t) - b_2(t)]\frac{\Delta f}{2}t\right)dt \quad (3)$$

As may be appreciated, when Δf is set to a value such that $\Delta f NT_b$ is an integer, the correlation value Corr[$X_1(t),X_2(t)$] is zero for $b_1(nTb) \neq b_2(nTb)$ for all values of n=1 through N. The correlation is maximum when $b_1(nTb)=b_2(nTb)$. In the relation (2), the first term within the integration represents the baseband signal received from the RF front end 170 and the second term represents the local reference at the receiver. Accordingly, the correlation properties of the bit sequence are maintained after the modulation for all bit sequences. Thus, demodulator 180 identifies and demodulates the baseband signal when the value of the correlation Corr[$X_1(t),X_2(t)$] is above a threshold.

In another embodiment, the baseband modulator 150 performs Phase Shift Keying operation, in that the phase of a carrier signal is altered to represent symbol or a bit value. The baseband modulated signal for a Quadrature Phase shift keying may be represented as:

$$Y(t)=A\cos(2\pi f_c t + b(t)\Delta\Theta + \phi) \quad (4)$$

In that, b(t) takes value +3, +1, −1 and −3 for four symbol values.

In one embodiment the modulator 150 selects the parameter ΔΘ in relation to the symbol duration $T_b$ and the length of the preamble sequence N such that a product of ΔΘ, N and Tb is an integer. In one embodiment the ΔΘ is set to a value in the range of $$\frac{2\pi}{NTb}$$

(being smallest value) and $$\frac{2\pi M}{Tb}$$

being the largest value, wherein M is in radians, starting from 1. However, we can choose M such that the constellation looks symmetric. The baseband modulated signal X(t) is provided to RF frontend 160.

The demodulator 180 performs autocorrelation between the received baseband signal $Y_1(t)$ and a known baseband signal $Y_2(t)$. The correlation value may be represented as Corr[$Y_1(t), Y_2(t)$] and the relation may be expressed as:

$$\int_0^{NTb} A_1\cos(2\pi f_c t + b_1(t)\Delta\Theta + \phi) * A_2\cos(2\pi f_c t + b_2(t)\Delta\Theta + \phi)dt \quad (3)$$

The integration in the relation (2) simplifies to:

$$\frac{A_1 A_2}{2}\int_0^{NTb}\cos(2\pi[b_1(t) - b_2(t)]\Delta\Theta t)dt$$

As may be appreciated, when ΔΘ is set to a value such that $\Delta\Theta NT_b$ is an integer, the correlation value Corr[$Y_1(t),Y_2(t)$] is zero for $b_1(nTb) \neq b_2(nTb)$ for all values of n=1 through N. The correlation is maximum when $b_1(nTb)=b_2(nTb)$. In the relation (3), the first term within the integration represents the baseband signal received from the RF front end 170 and the second term represents the local reference at the receiver. Accordingly, the correlation properties of the bit sequence are maintained after the modulation for all bit sequences. Thus, demodulator 180 identifies and demodulates the baseband signal when the value of the correlation Corr[$Y_1(t),Y_2(t)$] is above a threshold. The manner in which a digital communication system may be deployed in an embodiment is further described below.

FIG. 4 is a block diagram illustrating an example digital communication system in an embodiment. The system is shown comprising preamble generator 410, encoder 420, baseband modulator 430, RF transmitter 440, channel 445, RF receiver 450, Packet Identifier 460, baseband demodulator 470, packet detection 480, time sync 485, and data extractor 490. Each element is further described in further detail below.

The preamble generator 410 generates a preamble bits sequence of N bits and each bit having time duration of $T_b$. The preamble generator may be configured to select any standard code sequence having a correlation property. In one embodiment the preamble bit sequence is bit complimentary Golay code sequence of 128 bits (N=128) and $T_b$=1/BaudRate (or symbol rate). In another embodiment the bit sequence is a GOLD code sequence. The preamble generator 410 may generate the preamble sequence using any known techniques.

The encoder 420 receives information on path 101 and preamble bit sequence on path 112. The encoder 420 may include both preamble and information bits in a packet with preamble sequence at the start of the sequence for synchronization and the information bits in the later part of the sequence. The encoder may generate data packets comprising the preamble and information bits or symbols (discrete values each representing set of bits) and send the packets at a rate $1/T_b$ for example. The data packets and the data rate, symbol width, etc., are provided to baseband modulator 430.

The baseband modulator 430 performs one of FSK, PSK and ASK operations on carrier signal by varying a desired parameter such that the preamble bit sequence maintain the correlation property in its baseband or IF modulated wave form. The baseband modulator may be implemented as described in the above sections.

The RF transmitter 440, the channel 445 and the RF receiver 450 operate similar to the RF frontend 160, channel 120, and the RF frontend 170 described in sections above. Accordingly the RF receiver 450 provides a baseband signal (down converted) on path 456.

The packet identifier 460 performs autocorrelation of the received baseband signal on path 456 with a known baseband signal of the preamble sequence received on path 112. Packet identifier 460 passes the received baseband signal if the autocorrelation value is above a threshold value (when a correlation peak is detected). The packet identifier 460 may also provide a time reference of the correlation peak. The Packet identifier 460 may perform correlation as described in sections above.

FIGS. 5A and 5B respectively are illustrating the correlation of modulated A and B sequences with Modulated [A B A B] when the value of BFSK modulation parameter chosen as small, according to one embodiment. In that, two known sequence ("A" and "B") of 128 bits Golay sequences are concatenated to form "A", "B", "A", "B" sequence. The Concatenated sequence is baseband modulated ("ABAB" baseband signal). The FIG. 5A illustrates the two correlation peaks 501 and 502 resulting when "ABAB" baseband signal is correlated with known baseband "A" sequence by choosing the value of BFSK modulated parameter (Δf) as small. The peaks 501 and 502 represent detection of two "A" sequences in the concatenated ABAB baseband signal. Similarly, the FIG. 5B illustrates two correlation peaks 503 and 504 corresponding identification of two B sequence when "ABAB" baseband signal is correlated with baseband "B" sequence. FIG. 5C illustrates summation of correlation with sequence A and B when the value of BFSK modulation parameter chosen as small, according to one embodiment.

Figure 6A:
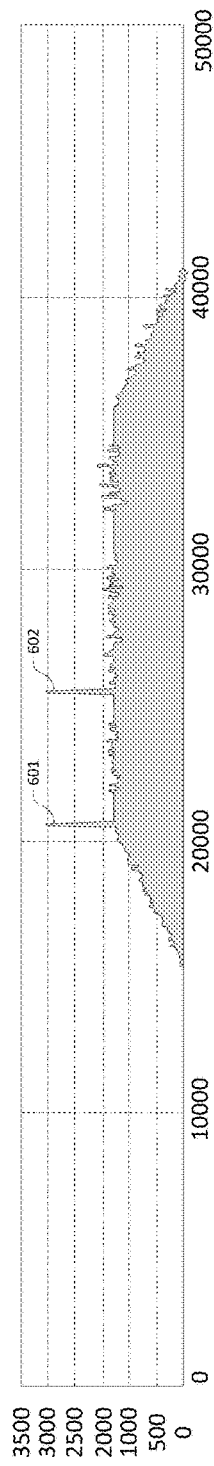
FIGS. 6A and 6B respectively are illustrating the correlation of modulated A and B sequences with Modulated [A B A B] when BFSK modulation parameter chosen as large value, according to one embodiment.
Figure 6B:
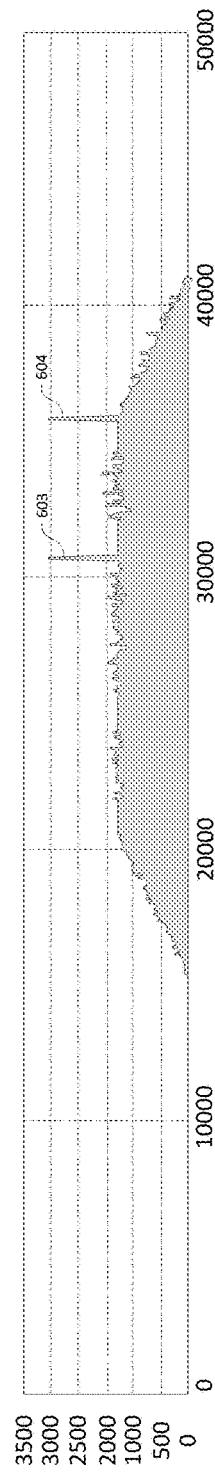
Figure 6C:
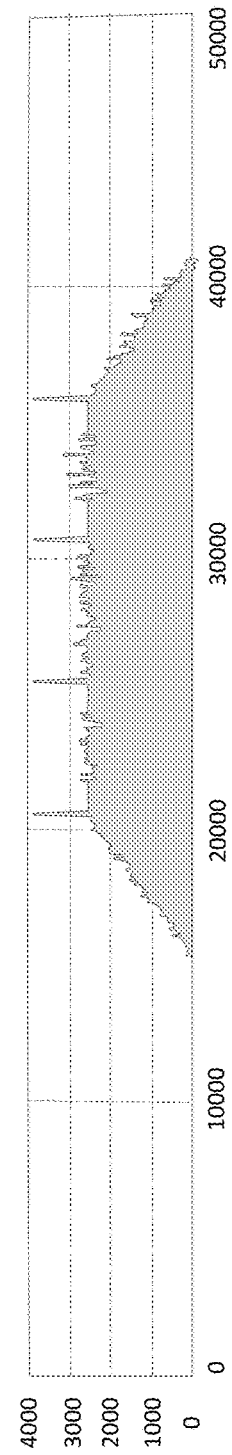
FIG. 6C illustrates summation of correlation with sequence A and B when BFSK modulation parameter chosen as large value, according to one embodiment.

FIGS. 6A and 6B respectively are illustrating the correlation of modulated A and B sequences with Modulated [A B A B] when the value of BFSK modulation parameter chosen as large, according to one embodiment. The FIG. 6A illustrates the two correlation peaks 601 and 602 resulting when "ABAB" baseband signal is correlated with known baseband "A" sequence by choosing the value of BFSK modulated parameter (Δf) as large. The peaks 601 and 602 represent detection of two "A" sequences in the concatenated ABAB baseband signal. Similarly, the FIG. 6B illustrates two correlation peaks 603 and 604 corresponding identification of two B sequence when "ABAB" baseband signal is correlated with baseband "B" sequence. FIG. 6C illustrates summation of correlation with sequence A and B when the value of BFSK modulation parameter chosen as large, according to one embodiment.

Figure 7B:
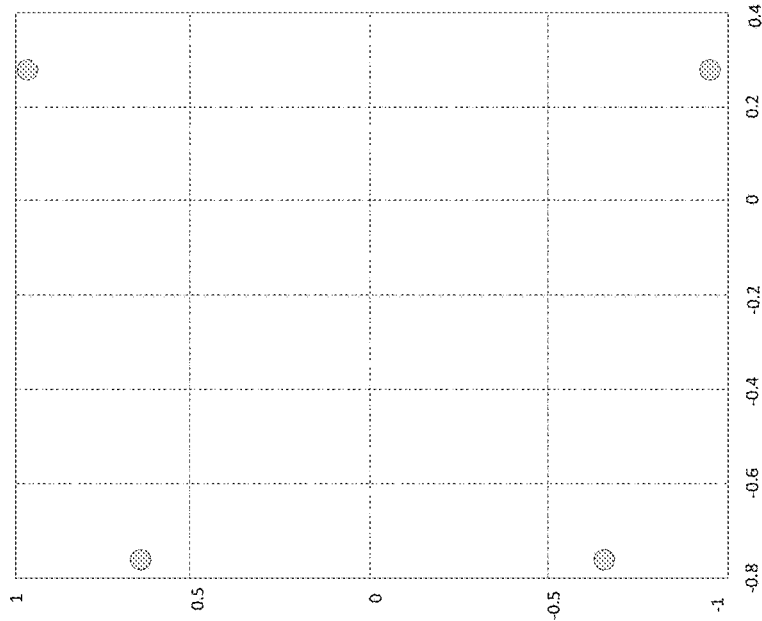
FIGS. 7A and 7B respectively are illustrating constellation for larger and smaller value of modulation parameter ($\Delta\Theta$).
Figure 7A:
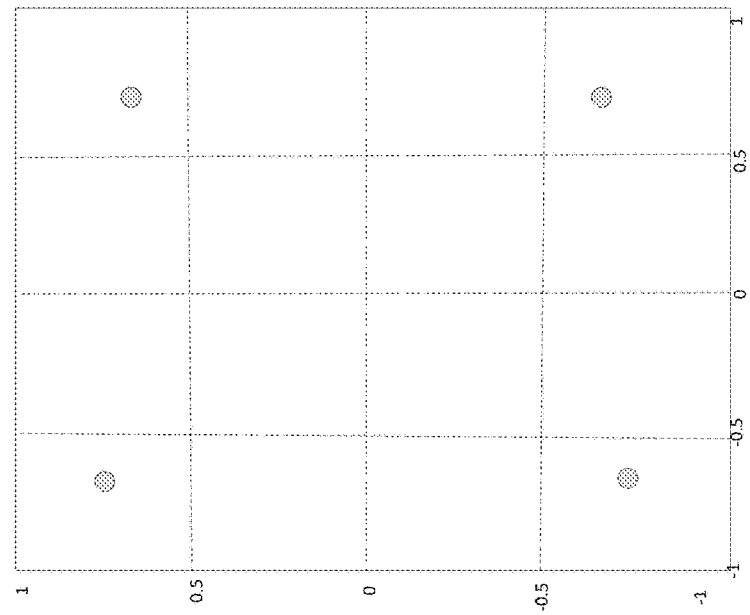

FIGS. 7A and 7B respectively are illustrating constellation for larger and smaller value of modulation parameter (ΔΘ). As may be appreciated, the larger M, same number of selectable/possible sets of constellation points is available by picking values from 1 to M. Among these sets, designer selects the one which gives symmetric constellation and/or maximum of minimum Euclidean distance between the constellation points. For example, QPSK modulation needs four distinct phase angles and they are selected for representing the symbols. The selected phase angles are represented as dots in the constellation plot. In one embodiment, the four phase angles for representation are selected to reduce the bit error. Alternately the four phase angles are selected to have maximum Euclidean distance and hence exhibit symmetry in the constellation.

Figure 8A:
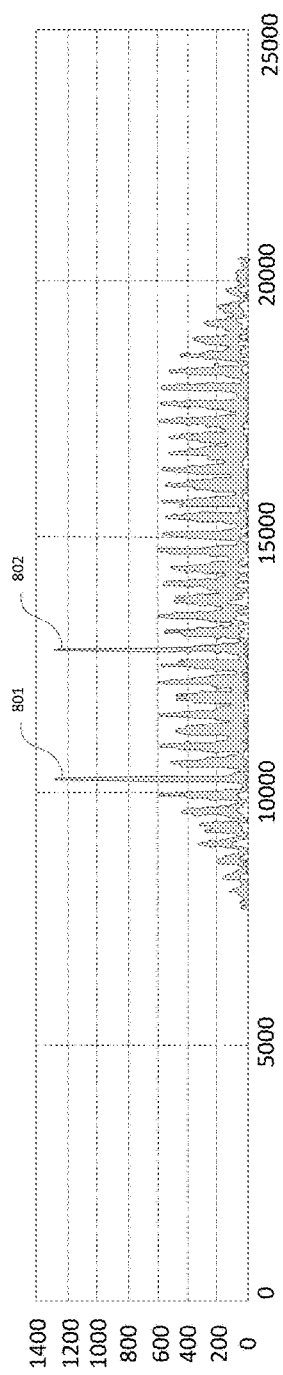
FIGS. 8A and 8B respectively are illustrating the correlation of modulated A and B sequences with Modulated [A B A B] when QPSK modulation parameter chosen as large value, according to one embodiment.
Figure 8B:
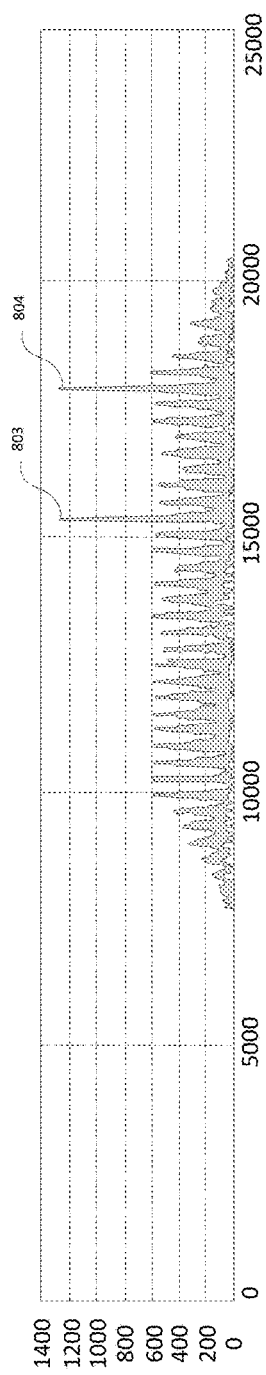
Figure 8C:
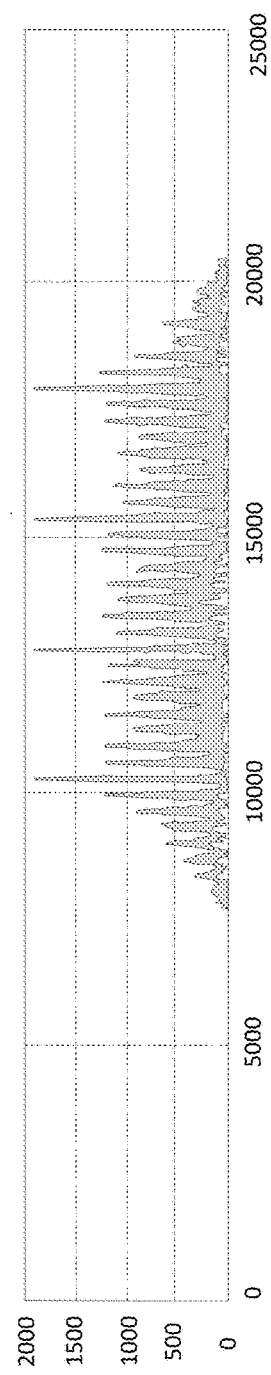
FIG. 8C illustrates summation of correlation with sequence A and B when QPSK modulation parameter chosen as large value, according to one embodiment.

FIGS. 8A and 8B respectively are illustrating the correlation of modulated A and B sequences with Modulated [A B A B] when the value of QPSK modulation parameter chosen as large, according to one embodiment. The FIG. 8A illustrates the two correlation peaks 801 and 802 resulting when "ABAB" baseband signal is correlated with known baseband "A" sequence by choosing the value of QPSK modulated parameter (ΔΘ) as large. The peaks 801 and 802 represent detection of two "A" sequences in the concatenated ABAB baseband signal. Similarly, the FIG. 8B illustrates two correlation peaks 803 and 804 corresponding identification of two B sequence when "ABAB" baseband signal is correlated with baseband "B" sequence. FIG. 8C illustrates summation of correlation with sequence A and B when the value of QPSK modulation parameter chosen as large, according to one embodiment.

Figure 9A:
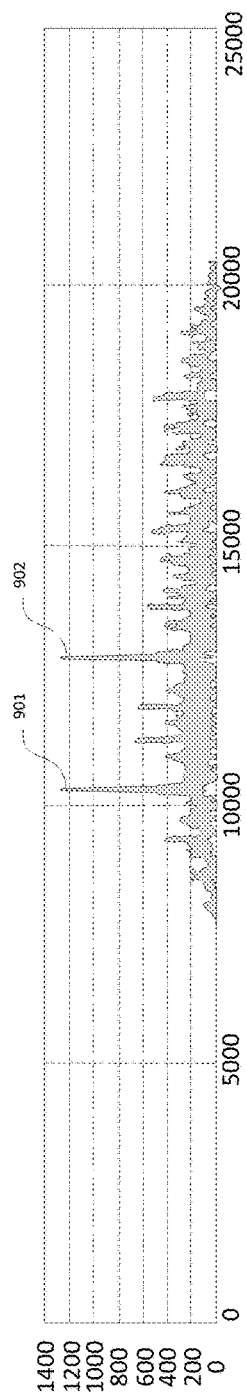
FIGS. 9A and 9B respectively are illustrating the correlation of modulated A and B sequences with Modulated [A B A B] when QPSK modulation parameter chosen as small value, according to one embodiment.
Figure 9B:
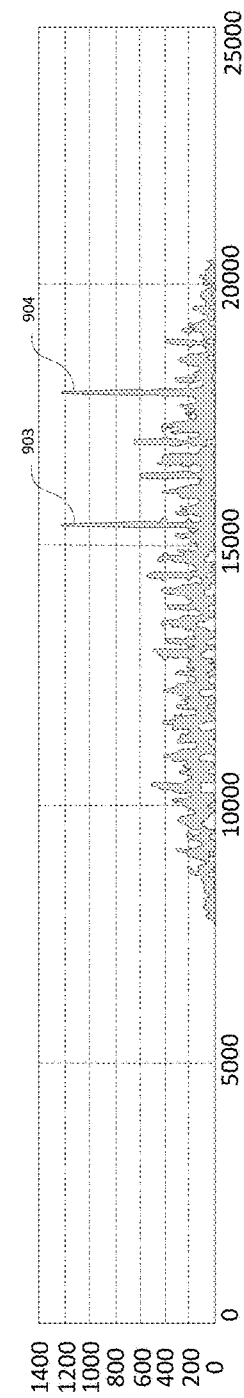
Figure 9C:
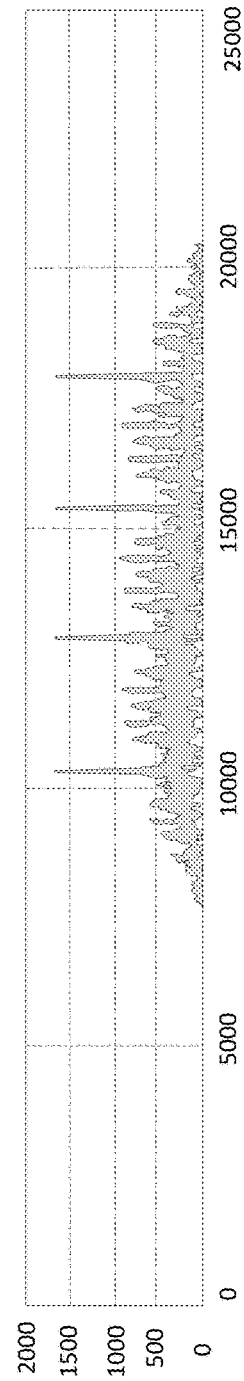
FIG. 9C illustrates summation of correlation with sequence A and B when QPSK modulation parameter chosen as large value, according to one embodiment.

FIGS. 9A and 9B respectively are illustrating the correlation of modulated A and B sequences with Modulated [A B A B] when the value of QPSK modulation parameter chosen as small, according to one embodiment. The FIG. 8A illustrates the two correlation peaks 901 and 902 resulting when "ABAB" baseband signal is correlated with known baseband "A" sequence by choosing the value of QPSK modulated parameter (ΔΘ) as small. The peaks 901 and 902 represent detection of two "A" sequences in the concatenated ABAB baseband signal. Similarly, the FIG. 9B illustrates two correlation peaks 903 and 904 corresponding identification of two B sequence when "ABAB" baseband signal is correlated with baseband "B" sequence. FIG. 9C illustrates summation of correlation with sequence A and B when the value of QPSK modulation parameter chosen as large, according to one embodiment.

The baseband demodulator 470 demodulates the baseband signal to generate bit or symbol sequence. The baseband demodulator is not operative until the correlation peak is detected at the packet identifier.

The packet detection block 480 receives correlation time reference from the packet identifier 460 and the bit/symbol sequence from the baseband demodulator. The packet detection block may primarily begin to detect the packet and its components around the time given by correlation time reference to start with. The packet detection block may further correlate the bit sequences in the digital domain and obtain several other boundary references of the packet or bit sequences. The boundary references thus obtained is provided to the time sync block 485. The time sync block generates a reference clock for extraction of the information.

The data extraction block 490, reads the bit value in the bit sequence at the clock instances (rising edge/falling edge) and generate information bits on path 499.

As a result, the packet detection block 480 and time sync 485 operate with a predetermined time reference (correlation peak time) there by reducing the time for synchronization. Further, the baseband demodulator 470 operate only when a relevant packet is identified thus, making the receiving operation more efficient at least in terms of power.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A method in a digital communication system comprising:
   receiving a bit sequence of length N comprising a set of preamble bits for transmission, the bit sequence having a first bit sequence property including at least one of a data rate, a symbol width ($T_b$), symbol rate, a sequence length (N);
   selecting a first modulation parameter including at least one of a frequency deviation ($\Delta f$) and a phase deviation ($\Delta \Theta$) in relation with the first bit sequence property;
   modulating a carrier signal with the first modulation parameter to generate a first baseband signal embedding information in the bit sequence;
   receiving a second baseband signal at a receiver;
   performing correlation of the second baseband signal and a reference baseband signal to generate a correlation result; and
   demodulating the second baseband signal to form a received bits when the correlation result peaks above a threshold value.

2. The method of claim 1, further comprising Frequency Shift Keying (FSK) the carrier signal and the first modulation parameter is $\Delta f$ and the first bit sequence property is a symbol duration $T_b$.

3. The method of claim 2, wherein the product $\Delta f$, N and $T_b$ is an integer and the $\Delta f$ in a range between $1/(NT_b)$ and $M/(T_b)$, in that M is an integer starting from 1, and M is chosen to meet spectral emission requirements of the transmitter.

4. The method of claim 1, further comprising Quadrature Phase Shift Keying (QPSK) the carrier signal and the first modulation parameter is $\Delta \Theta$ and the first bit sequence property is symbol duration $T_b$.

5. The method of claim 4, wherein the product $\Delta \Theta$, N and $T_b$ is an integer and the $\Delta \Theta$ is in the range between $2\pi/(NT_b)$ and $2\pi M/(T_b)$, in that the M is an integer starting from 1.

6. The method of claim 5, wherein the set of preamble bits comprises at least one of a binary complementary Golay code sequence and a binary Gold code sequence.

7. The method of claim 6, further comprising;
   setting a first time reference corresponding to time instance when the correlation result peaks above a first threshold; and
   decoding the received bits with reference to the first time reference to detect the set of preamble bits.

8. The method of claim 4, wherein phase angles for QPSK is selected such that they are symmetric and are at a maximum distance between themselves in a constellation of selectable phase angles formed due to selection of the $\Delta \Theta$.

9. The method of claim 1, wherein the modulation comprises, at least one of the BPSK, QPSK, FSK, and ASK.

* * * * *